United States Patent
Song et al.

(10) Patent No.: US 11,711,123 B2
(45) Date of Patent: Jul. 25, 2023

(54) MILLIMETER WAVE-BASED MULTI-USER MASSIVE MIMO-BASED HYBRID BEAMFORMING SYSTEM AND ANALOG PRECODER MATRIX ACQUISITION METHOD APPLIED THERETO

(71) Applicant: INDUSTRY ACADEMY COOPERATION FOUNDATION OF SEJONG UNIVERSITY, Seoul (KR)

(72) Inventors: Hyoung Kyu Song, Seongnam-si (KR); Ji Sung Jung, Seoul (KR); Won Seok Lee, Seoul (KR); Yeong Rong Lee, Seoul (KR); Ji Hye Oh, Seoul (KR)

(73) Assignee: INDUSTRY ACADEMY COOPERATION FOUNDATION OF SEJONG UNIVERSITY

( * ) Notice: Subject to any disclaimer, the term of this patent is extended or adjusted under 35 U.S.C. 154(b) by 0 days.

(21) Appl. No.: 17/500,930

(22) Filed: Oct. 13, 2021

(65) Prior Publication Data
US 2022/0368385 A1     Nov. 17, 2022

(30) Foreign Application Priority Data

Apr. 29, 2021   (KR) .................. 10-2021-0056047

(51) Int. Cl.
*H04L 1/02*     (2006.01)
*H04B 7/0456*   (2017.01)
*H04B 7/0452*   (2017.01)

(52) U.S. Cl.
CPC ......... *H04B 7/0465* (2013.01); *H04B 7/0452* (2013.01)

(58) Field of Classification Search
CPC ... H04L 1/0618; H04L 1/06; H04L 25/03343; H04B 7/0417; H04B 7/0617; H04B 7/0452; H04W 88/08; H04W 72/046
USPC ......................................... 375/267, 260, 262
See application file for complete search history.

(56) References Cited

U.S. PATENT DOCUMENTS

| 9,712,296 B2 | 7/2017 | Noh et al. |
| 9,967,014 B1* | 5/2018 | Park .................. H04B 7/0452 |
| 10,763,933 B1* | 9/2020 | Su ...................... H04B 7/0413 |

(Continued)

FOREIGN PATENT DOCUMENTS

| KR | 20090030200 A | 3/2009 |
| KR | 20140017487 A | 2/2014 |
| KR | 101625805 B1 | 5/2016 |

(Continued)

OTHER PUBLICATIONS

Tian Xie et al—Geometric Mean Decomposition Based Hybrid Precoding for MmWave Massive MIMO Systems, Jul. 2016, 6 pages (Year: 2016).*

*Primary Examiner* — Khai Tran
(74) *Attorney, Agent, or Firm* — Renaissance IP Law Group LLP

(57) ABSTRACT

The present inventive concept relates to a method for designing an optimal analog precoder for improving frequency spectrum efficiency in a millimeter wave-based multi-user massive MIMO-based hybrid beamforming system and a hybrid beamforming system applying the same, and more specifically, to a method for designing an optimal analog precoder using an approximation technique and an iterative optimization algorithm, and a hybrid beamforming system to which the same is applied.

16 Claims, 8 Drawing Sheets

(56) References Cited

U.S. PATENT DOCUMENTS

2016/0119910 A1\* 4/2016 Krzymien ............ H04B 7/0639
370/329

FOREIGN PATENT DOCUMENTS

| KR | 20160102488 | A  | 8/2016 |
|----|-------------|----|--------|
| KR | 102142953   | B1 | 9/2020 |
| KR | 102228091   | B1 | 3/2021 |

\* cited by examiner

FIG. 2
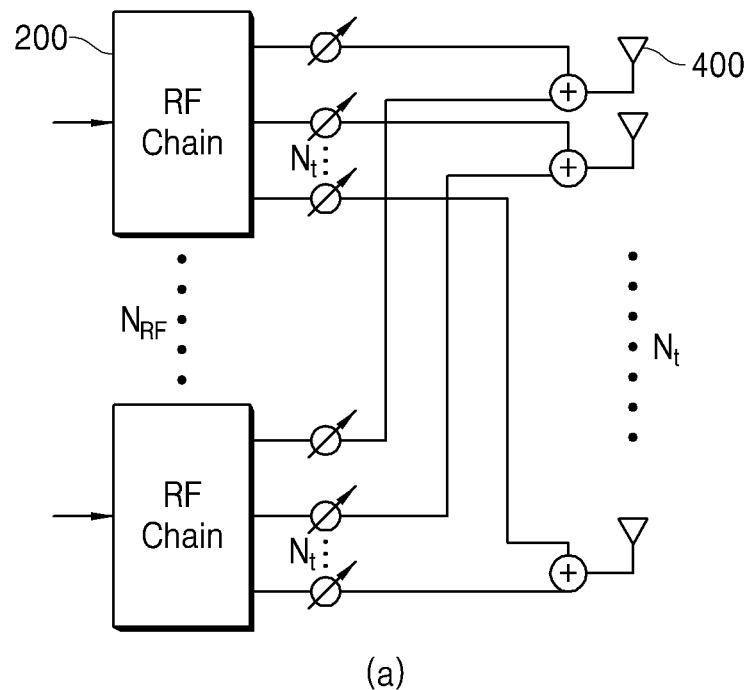
(a)
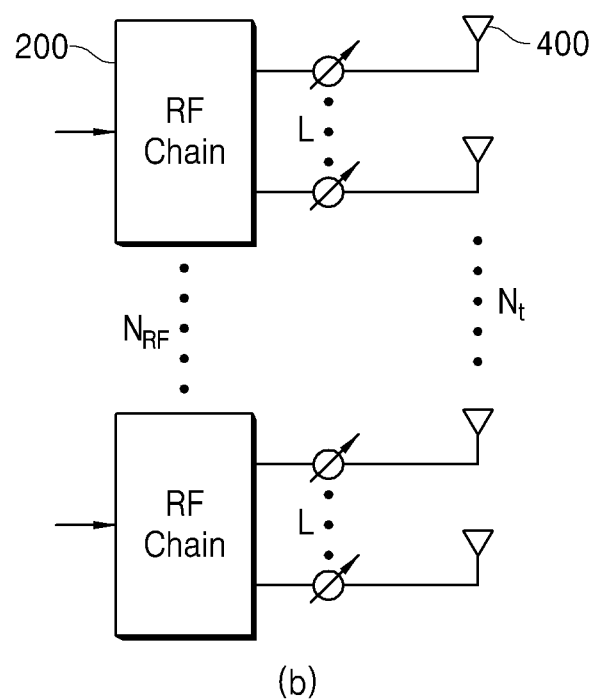
(b)

FIG. 4

1: Input : H
2: Initialization : Generate random initial matrix $F_{RF}$ that satisfies the constant modulus constraint.
3: $A = \frac{1}{K} \sum_{k=1}^{K} \left( H[k]H[k]^H \right)$
4: for $l = 1 : N_{RF}$ do
5:     Calculate $B_l = A - AF_{RF}^l(F_{RF}^{l\,H}AF_{RF}^l)^{-1}F_{RF}^{l\,H}A$
6:     Set $f_l = F_{RF}(:, l)$
7:     Update $F_{RF}(:, l) = \frac{1}{\sqrt{N_t}} e^{j\angle((f_l^H B_l)^H)}$
8: end for
9: Go to Step 4 until $F_{RF}$ converges
10: for $k = 1 : K$ do
11:     Calculate $F_{BB}[k]$ according to (8)
12: end for
13: Output : $F_{RF}, F_{BB}$

MILLIMETER WAVE-BASED MULTI-USER MASSIVE MIMO-BASED HYBRID BEAMFORMING SYSTEM AND ANALOG PRECODER MATRIX ACQUISITION METHOD APPLIED THERETO

CROSS-REFERENCE TO RELATED APPLICATION

This application claims priority to Korean Patent Application No. 10-2021-0056047 filed on Apr. 29, 2021 and all the benefits accruing therefrom under 35 U.S.C. § 119, the contents of which are incorporated by reference in their entirety.

TECHNICAL FIELD

The present disclosure relates to a method for designing an optimal analog precoder for improving frequency spectrum efficiency in a millimeter wave-based multi-user massive MIMO-based hybrid beamforming system.

BACKGROUND

As the generation of mobile communication evolves, millimeter wave (mmWave) technology that transmits data using a high frequency band is being introduced to improve the performance of the 5th generation mobile communication (5G) system. With mmWave technology, a wide bandwidth can be used to increase data transmission speed, but it has the disadvantage of high path loss. To compensate for these shortcomings, massive MIMO technology, which increases the transmission speed by mounting hundreds of antennas on the base station, has become an essential technology.

The conventional digital beamforming system can obtain high channel capacity by changing the amplitude and phase of a signal through digital signal processing in a baseband using a radio frequency (RF) chain for each antenna. However, as the number of antennas increases, a large number of RF chains requiring high cost and power consumption are required, which increases the volume, power consumption, and cost burden.

To alleviate these shortcomings, hybrid beamforming, which performs precoding using fewer RF chains than antennas, was adopted as a core technology in 5G. Hybrid beamforming is a system that combines the advantages and disadvantages of digital beamforming and analog beamforming, and uses fewer RF chains than the number of antennas, and uses a digital beamformer in a baseband and an analog beamformer in an RF band at the same time to perform beamforming by using a digital precoder and an analog precoder at the same time.

Since the analog precoder consists only of a phase shifter connected to each antenna, only the phase of the signal can be adjusted with a fixed amplitude, so that it should be designed to satisfy the constraint of transmit power. In addition, when using Orthogonal Frequency Division Multiplexing (OFDM), in an environment with high selectivity for each sub-carrier, the channel change occurs severely, and in the case of an analog precoder, since conversion into a high frequency band is performed through the RF chain, signal processing is performed in the RF band, so that there is a problem in that it is impossible to process signals on all sub-carriers like a digital precoder through this processing method. Accordingly, in such a system environment, the analog precoder performs signal processing by applying the same analog precoding matrix to all sub-carriers, so that significant performance degradation occurs in frequency selective fading environments.

As such, since analog precoders are subject to various design limitations, there are difficulties in optimizing the design of analog precoders, and implementing an efficient analog precoder is the main issue of hybrid beamforming.

Accordingly, there is a need for a technique capable of designing an analog precoder capable of obtaining high frequency spectrum efficiency while requiring relatively low complexity.

DISCLOSURE

Technical Problem

The present inventive concept is to solve the above-mentioned problems, and is to provide an analog precoder matrix acquisition method for alleviating performance degradation of frequency spectrum efficiency occurring in a frequency selective fading environment and a hybrid beamforming system to which the method is applied.

Technical Solution

An analog precoding matrix acquisition method for frequency spectrum enhancement according to the present inventive concept includes: an objective form setting step of setting an objective form for maximizing a frequency spectrum efficiency of an analog precoder based on a frequency spectrum efficiency for a sub-carrier of a transmission end Tx; an approximation step of transforming and approximating the objective form set in the objective form setting step using a digital precoding matrix for the sub-carrier of the transmission end Tx; an analog precoding matrix generation step of generating an analog precoding matrix by calculating for each column of the analog precoding matrix based on the objective form approximated through the approximation step; and an optimal analog precoding matrix determination step of comparing elements between the analog precoding matrix generated in the analog precoding matrix generation step and a predetermined initial analog precoding matrix currently applied to the analog precoder to determine an optimal analog precoding matrix according to whether an error between the generated analog precoding matrix and the initial analog precoding matrix is within a predetermined error range.

Here, the optimal analog precoding matrix determination step includes, when an error between the generated analog precoding matrix and the initial analog precoding matrix is included within a predetermined error range, determining the generated analog precoding matrix as an optimal analog precoding matrix for frequency spectrum improvement and updating the initial analog precoding matrix to the optimal analog precoding matrix.

Moreover, the optimal analog precoding matrix determination step includes, when the error between the generated analog precoding matrix and the initial analog precoding matrix is out of a predetermined error range, deriving an optimal analog precoding matrix by repeatedly performing the analog precoding matrix generation step to the optimal analog precoding matrix determination step until the error is within the predetermined error range.

Here, the objective form set in the objective form setting step is according to the following (Equation 1).

$$= \underset{F_{RF}, F_{BB}}{\operatorname{argmax}} \frac{1}{K} \sum_{k=1}^{K} \sum_{u=1}^{K} R_u[k] \quad \text{(Equation 1)}$$

Here, $N_t$ is the number of transmission antennas, $N_{RF}$ is the number of RF chains, $F_{RF}$ is an analog precoding matrix of a size of $N_t \times N_{RF}$ that is equally applied to all sub-carriers, $N_u$ is the number of user terminals having a single antenna corresponding to the reception end Rx, $F_{BB}[k] = [f_{BB,1}[k], f_{BB,2}[k], \ldots, f_{BB,N_u}[k]]$ is a digital precoding matrix having a size of $N_{RF} \times N_s$ corresponding to the k-th sub-carrier for $N_u$ user terminals, and $$R_u[k] = \log_2 \left( 1 + \frac{|h_u[k]^H F_{RF} f_{BB,u}[k]|^2}{\sigma^2 + \sum_{i=u} |h_u[k]^H F_{RF} f_{BB,i}[k]|^2} \right)$$

means the frequency spectrum efficiency for the k-th sub-carrier of the u-th user terminal. P means the maximum transmission power of the transmission end Tx, $\sigma^2$ means the variance of Additive White Gaussian Noise (AWGN), and $^H$ represents the hermitian of the matrix.

Furthermore, the objective form obtained by using the digital precoding matrix for the sub-carrier of the transmission end Tx of the objective form of (Equation 1) above is derived by the following (Equation 2).

$$= \frac{1}{K} \sum_{k=1}^{K} \sum_{u=1}^{N_u} R_u[k] \geq \quad \text{(Equation 2)}$$

$$N_u \log_2 \left( 1 + \frac{N_{RF}}{\sigma^2 N_u^2} \left| F_{RF}^H \left( \frac{1}{K} \sum_{k=1}^{K} H[k] H[k]^H \right) F_{RF} \right|^{\frac{1}{N_{RF}}} \right)$$

Here, $N_t$ is the number of transmission antennas, $N_{RF}$ is the number of RF chains, $F_{RF}$ is an analog precoding matrix of a size of $N_t \times N_{RF}$ that is equally applied to all sub-carriers, $N_u$ is the number of user terminals having a single antenna corresponding to the reception end Rx, $$R_u[k] = \log_2 \left( 1 + \frac{|h_u[k]^H F_{RF} f_{BB,u}[k]|^2}{\sigma^2 + \sum_{i=u} |h_u[k]^H F_{RF} f_{BB,i}[k]|^2} \right)$$

means the frequency spectrum efficiency for the k-th sub-carrier of the u-th user terminal, and $^H$ represents the hermitian of the matrix.

Moreover, in the analog precoding matrix generation step, the generating of the analog precoding matrix based on the approximated objective form is performed by the following (Equation 3).

$$= \underset{f_l}{\operatorname{argmax}} \sum_{l=1}^{N_{RF}} |f_l^H B_l f_l| \quad \text{(Equation 3)}$$

Here, $N_{RF}$ is the number of RF chains, $$f_l = \frac{1}{\sqrt{N_l}} e^{j(\angle(f_l^H B_l^H))}$$

is an expression for calculating the l-th column vector of the analog precoding matrix, $B_l = A - AF_{RF}{}^l (F_{RF}{}^{l\,H} A F_{RF}{}^l)^{-1} F_{RF}{}^l{}_H A$ means a semi-determined matrix, $$A = \frac{1}{K} \sum_{k=1}^{K} (H[k] H[k]^H)$$

means the average channel covariance matrix for all K sub-carriers, $f_l$ means the l-th column in $F_{RF}$, $F_{RF}{}^l$ means a matrix with the l-th column removed from $F_{RF}$, and $^H$ represents the hermitian of the matrix.

A multi-user MIMO-based hybrid beamforming system (only, $(N_s < N_{RF} \ll N_t, N_s = N_u)$) according to the present inventive concept, in which a base station with $N_t$ transmission antennas and $N_{RF}$ RF chains supports $N_s$ independent data streams to $N_u$ user terminals having one antenna, includes: a digital precoder configured to adjust an amplitude and phase of a plurality of data stream signals to be applied; an RF chain provided as many as the number corresponding to the data stream signal, and configured to RF-convert the signal whose amplitude and phase are adjusted by the digital precoder and transmit the converted signal to the analog precoder; and an analog precoder configured to adjust the phase of the signal by multiplying the output signal from the digital precoder delivered through each RF chain by predetermined analog precoding matrices, and radiate the phase-adjusted signal to one or more user terminals through multiple paths, wherein the analog precoding matrix of the analog precoder is approximated by modifying an objective form set to maximize the frequency spectrum efficiency of the analog precoder based on the frequency spectrum efficiency for the sub-carrier to each user terminal and is applied as an optimal analog precoding matrix generated based on the approximated objective form.

Here, the optimal analog precoding matrix is determined as an analog precoding matrix generated to satisfy the error range condition by comparing whether the error between the analog precoding matrix generated based on the approximated objective form and a predetermined initial analog precoding matrix of the analog precoder meets a predetermined error range condition.

Furthermore, the analog precoder consists of a first structure in which $N_t$ transmission antennas are connected to all $N_{RF}$ RF chains, respectively.

Moreover, the analog precoder consists of a second structure in which xxx transmission antennas are connected to one RF chain.

Here, the objective form set to maximize the frequency spectrum efficiency of the analog precoder is according to the following (Equation 1).

$$\underset{F_{RF}, F_{BB}}{\operatorname{argmax}} \frac{1}{K} \sum_{k=1}^{K} \sum_{u=1}^{N_u} R_u[k] \quad \text{(Equation 1)}$$

Here, $N_t$ is the number of transmission antennas, $N_{RF}$ is the number of RF chains, $F_{RF}$ is an analog precoding matrix of a size of $N_t \times N_{RF}$ that is equally applied to all sub-carriers, $N_u$ is the number of user terminals having a single antenna corresponding to the reception end Rx, $F_{BB}[k]=[f_{BB,1}[k], f_{BB,2}[k], \ldots, f_{BB,N_u}[k]]$ is a digital precoding matrix having a size of $N_{RF} \times N_s$ corresponding to the k-th sub-carrier for $N_u$ user terminals, and $$R_u[k] = \log_2\left(1 + \frac{|h_u[k]^H F_{RF} f_{BB,u}[k]|^2}{\sigma^2 + \sum_{i=u} |h_u[k]^H F_{RF} f_{BB,i}[k]|^2}\right)$$

means the frequency spectrum efficiency for the k-th sub-carrier of the u-th user terminal. P means the maximum transmission power of the transmission end Tx, $\sigma^2$ means the variance of Additive White Gaussian Noise (AWGN), and $^H$ represents the hermitian of the matrix.

In addition, the approximation of the objective form of (Equation 1) is approximated using a digital precoding matrix for the sub-carrier of the transmission end Tx, wherein the approximated objective form is derived by the following (Equation 2).

$$= \frac{1}{K}\sum_{k=1}^{K}\sum_{u=1}^{N_u} R_u[k] \geq \qquad \text{(Equation 2)}$$

$$N_u \log_2\left(1 + \frac{N_{RF}}{\sigma^2 N_u^2}\left|F_{RF}^H\left(\frac{1}{K}\sum_{k=1}^{K} H[k]H[k]^H\right)F_{RF}\right|^{\frac{1}{N_{RF}}}\right)$$

Here, $N_t$ is the number of transmission antennas, $N_{RF}$ is the number of RF chains, $F_{RF}$ is an analog precoding matrix of a size of $N_t \times N_{RF}$ that is equally applied to all sub-carriers, $N_u$ is the number of user terminals having a single antenna corresponding to the reception end Rx, $$R_u[k] = \log_2\left(1 + \frac{|h_u[k]^H F_{RF} f_{BB,u}[k]|^2}{\sigma^2 + \sum_{i=u} |h_u[k]^H F_{RF} f_{BB,i}[k]|^2}\right)$$

means the frequency spectrum efficiency for the k-th sub-carrier of the u-th user terminal, and $^H$ represents the hermitian of the matrix. Moreover, the analog precoding matrix generated based on the approximated objective form is generated by the following (Equation 3).

$$\underset{f_l}{\operatorname{argmax}} \sum_{l=1}^{N_{RF}} |f_l^H B_l f_l| \qquad \text{(Equation 3)}$$

Here, $N_{RF}$ is the number of RF chains, $$f_l = \frac{1}{\sqrt{N_t}} e^{j\left((f_l^H B_l)^H\right)}$$

is an expression for calculating the l-th column vector of the analog precoding matrix, $B_l = A - AF_{RF}^l (F_{RF}^{l~H} A F_{RF}^l)^{-1} F_{RF}^l{}^H A$ means a semi-determined matrix, $$A = \frac{1}{K}\sum_{k=1}^{K}\left(H[k]H[k]^H\right)$$

means the average channel covariance matrix for all K sub-carriers, $f_l$ means the i-th column in $F_{RF}$, $F_{RF}^l$ means a matrix with the l-th column removed from $F_{RF}$, and $^H$ represents the hermitian of the matrix. Furthermore, analog precoding matrix generated based on the approximated objective form is generated by the following (Equation 4).

$$= \underset{f_{sub,l}}{\operatorname{argmax}} \sum_{l=1}^{N_{RF}} |f_{sub,l}^H B_{sub,l} f_{sub,l}| \qquad \text{(Equation 4)}$$

Here, $N_{RF}$ is the number of RF chains, $$f_{sub,l} = \frac{1}{\sqrt{L}} e^{j\left((f_{sub,l}^H B_{sub,l})^H\right)}$$

is an expression to calculate the l-th column vector of the analog precoding matrix, $f_{sub,l}$ is the l-th column of the analog precoding matrix having a length of L, and $B_{sub,l}$ means the l=th block matrix of $B_l$ having a size of L×L, and $^H$ represents the hermitian of the matrix.

In addition, the approximation of the objective form of (Equation 1) using the digital precoding matrix for the sub-carrier of the transmission end Tx is to be approximated according to the following (Equation 5).

$$\frac{1}{K}\sum_{k=1}^{K}\sum_{u=1}^{N_u} R_u[k] \stackrel{(a)}{\leq} \qquad \text{(Equation 5)}$$

$$\frac{N_u}{K}\sum_{k=1}^{K} \log_2\left(1 + \frac{1}{\sigma^2}\frac{1}{Tr\left((H[k]^H F_{RF} F_{RF}^H H[k])^{-1}\right)}\right) \stackrel{(b)}{\leq}$$

$$N_u \log_2\left(1 + \frac{1}{\sigma^2 K}\sum_{k=1}^{K}\frac{1}{Tr\left((H[k]^H F_{RF} F_{RF}^H H[k])^{-1}\right)}\right) \stackrel{(c)}{\leq}$$

$$N_u \log_2\left(1 + \frac{1}{\sigma^2 K N_u^2}\sum_{k=1}^{K} Tr\left(H[k]^H F_{RF} F_{RF}^H H[k]\right)\right) =$$

$$N_u \log_2\left(1 + \frac{1}{\sigma^2 N_u^2} Tr\left(F_{RF}^H\left(\frac{1}{K}\sum_{k=1}^{K}(H[k]H[k]^H)\right)F_{RF}\right)\right) \stackrel{(d)}{\geq}$$

$$N_u \log_2\left(1 + \frac{N_{RF}}{\sigma^2 N_u^2}\left|F_{RF}^H\left(\frac{1}{K}\sum_{k=1}^{K} H[k]H[k]^H\right)F_{RF}\right|^{\frac{1}{N_{RF}}}\right)$$

Here, $N_u$ is the number of user terminals having a single antenna corresponding to the reception end Rx, $$R_u[k] = \log_2\left(1 + \frac{|h_u[k]^H F_{RF} f_{BB,l}[k]|^2}{\sigma^2 + \sum_{i=u} |h_u[k]^H F_{RF} f_{BB,i}[k]|^2}\right)$$

means the frequency spectrum efficiency of the k-th sub-carrier of the u-th user terminal, $^H$ represents the hermitian of the matrix, $\sigma^2$ means dispersion of Additive White Gaussian Noise (AWGN), $H_{eff}[k]=H[k]^H F_{RF}$ means an effective channel expressed by the combination of an analog precoder and a channel. In addition, (b) utilizes the property of Jensen's inequality, and (c) and (d) are derived by utilizing the fact that a definite matrix M having a size of n×n satisfies the inequality property of $$\frac{1}{Tr(M^{-1})} \le \frac{1}{n}\det(M)^{\frac{1}{n}} \le \frac{1}{n^2}Tr(M).$$

Advantageous Effects

The present inventive concept designs an analog precoder by obtaining an analog precoding matrix through an approximation technique of error minimization and an iterative optimization algorithm in a hybrid beamforming system, so that in a frequency selective fading environment, higher frequency spectrum efficiency performance can be obtained compared to the conventional analog precoder.

In addition, by implementing such a hybrid beamforming system, it is possible to achieve performance close to digital beamforming while using an RF chain equivalent to half of a transmission antenna.

BRIEF DESCRIPTION OF THE DRAWINGS

FIG. 2 is a diagram illustrating a structure of an analog precoder applied to a hybrid beamforming system according to an embodiment of the present inventive concept.

FIG. 4 is a diagram illustrating an optimization process for obtaining an optimal precoding matrix according to an embodiment of the present inventive concept.

DETAILED DESCRIPTION

Figure 1:
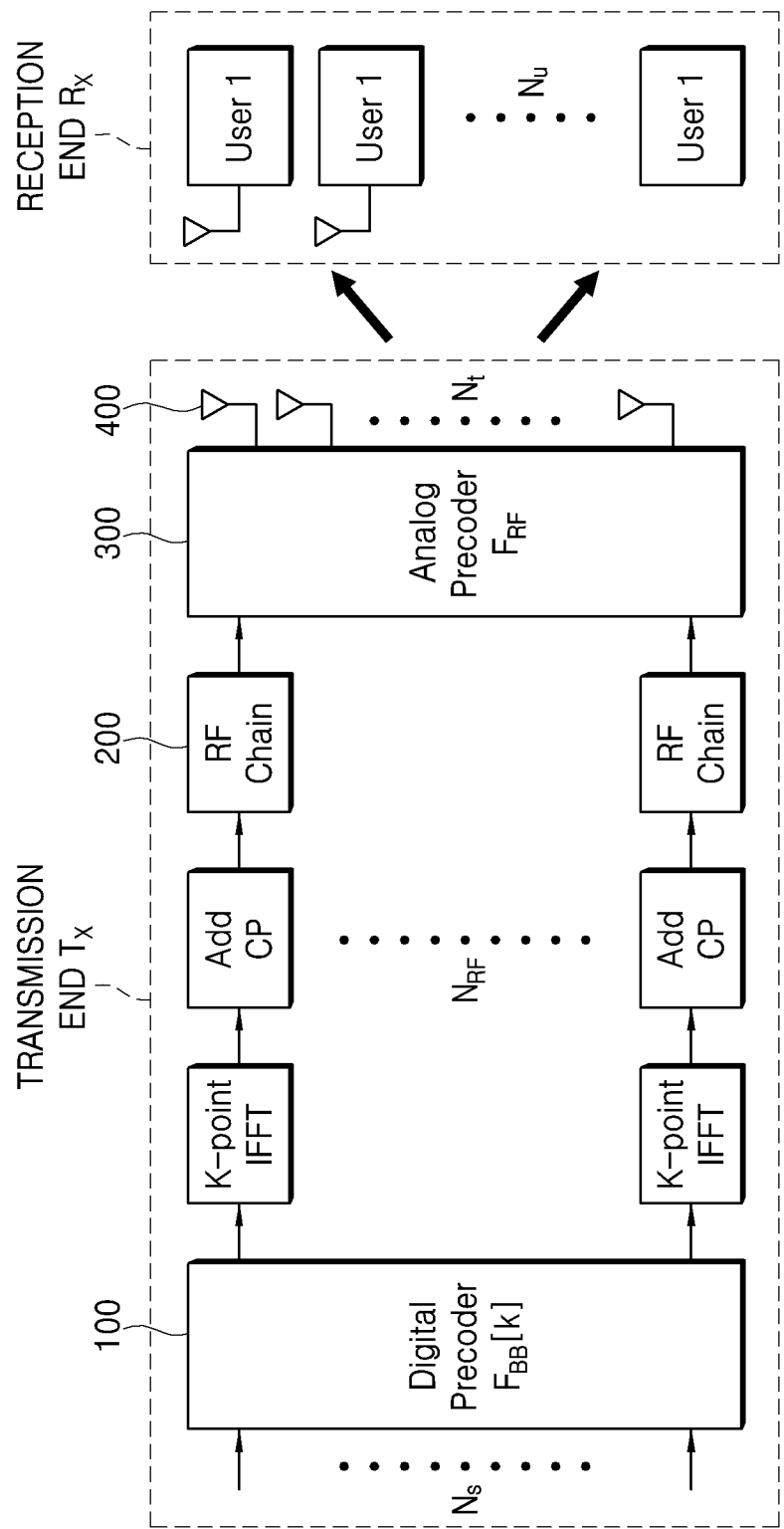
FIG. 1 is a view showing the overall configuration of a millimeter wave-based multi-user massive MIMO-based hybrid beamforming system according to an embodiment of the present inventive concept.

Hereinafter, embodiments of the present inventive concept will be described in detail with reference to the accompanying drawings so that those of ordinary skill in the art may easily implement the present inventive concept. However, the present inventive concept may be implemented in various forms and is not limited to the embodiments described herein. In the drawings, parts irrelevant to the description are omitted in order to clearly describe the present inventive concept, and like reference numerals refer to like elements throughout the specification.

Hereinafter, the present inventive concept will be described in detail with reference to the drawings.

The present inventive concept relates to a method for designing an optimal analog precoder for efficient hybrid beamforming in a millimeter wave-based massive multi-user MIMO system.

More specifically, it relates to an analog precoding matrix acquisition algorithm for designing an optimal analog precoder in a hybrid beamforming system using orthogonal frequency division multiplexing (OFDM).

1. Hybrid Beamforming System According to Present Inventive Concept

FIG. 1 is a diagram showing the overall configuration of a millimeter wave-based multi-user massive MIMO-based hybrid beamforming system according to an embodiment of the present inventive concept.

As shown in FIG. 1, it is assumed that the hybrid beamforming system of the present inventive concept is a system in which a transmission end Tx having $N_t$ transmission antennas and $N_{RF}$ RF chains supports xxx independent data streams to $N_u$ user terminals user1, user2, . . . having one antenna. It is also assumed that the number of transmission streams, antennas, RF chains, and user terminals satisfies the following. ($N_s < N_{RF} \ll N_t$, $N_s = N_u$)

In this case, the transmission signal corresponding to the K-th (k=1, . . . ) sub-carrier transmitted from the transmission end Tx may be expressed as follows (Equation 1).

$$x[k]=F_{RF}F_{BB}[k]s[k] \quad \text{(Equation 1)}$$

Here, $F_{RF}$ represents an analog precoding matrix having a size of $N_t \times N_{RF}$ that is equally applied to all sub-carriers, $F_{BB}[k]=[f_{BB,1}[k], f_{BB,2}[k], \ldots, f_{BB,N_u}[k]]$ represents a digital precoding matrix with a size of $N_{RF} \times N_s$ corresponding to the k-th sub-carrier for $N_u$ user terminals, and s[k] represents a data stream vector corresponding to the k-th sub-carrier having a size of $N_s \times 1$.

In the transmission end Tx, assuming that $N_t = N_{RF}$, for the baseband, the data stream is divided into each RF chain through the digital precoder 100, and the phase of the signal is adjusted through the analog precoding matrix of the analog precoder 200.

Accordingly, the reception signal of the u-th user terminal corresponding to the k-th sub-carrier may be expressed as (Equation 2) below.

$$y_u[k] = h_u[k]^H F_{RF} F_{BB}[kk]s[k] + n_u[k] \quad \text{(Equation 2)}$$

Here, $H[k]=[h_1[k], h_2[k], \ldots, h_{N_u}[k]]$ means a channel matrix corresponding to the k-th sub-carrier having a size of $N_t \times N_u$, and consists of the column vector $h_u[k]$ of the channel for each user terminal, $n_u[k]$ is an Additive White Gaussian Noise (AWGN) vector, $F_{RF}$ is an analog precoding matrix of the size of $N_t \times N_{RF}$, which is applied equally to all sub-carriers, $F_{BB}[k]=[f_{BB,1}[k], f_{BB,2}[k], \ldots, f_{BB,N_u}[k]]$ is a digital precoding matrix of the size of $N_{RF} \times N_s$ corresponding to the k-th sub-carrier for user terminals, and s[k] is a data stream vector corresponding to the k-th sub-carrier having a size of $N_s \times 1$.

FIG. 2 is a diagram illustrating an analog precoder structure applied to the hybrid beamforming system of the present inventive concept.

Referring to FIG. 2, (a) is a fully-connected structure in which each transmission antenna is connected to all RF chains (hereinafter referred to as Structure 1), and (b) is a sub-connected structure (hereinafter referred to as Structure 2) in which each transmission antenna is connected to one RF chain.

First, the analog precoding matrix of the analog precoder having the Structure 1 as shown in (a) of FIG. 2 may be expressed as the following (Equation 3).

$$F_{RF} = [f_{RF,1}, f_{RB,2} \ldots f_{RF,N_{RF}}] \quad \text{(Equation 3)}$$

Here, $f_{RF,i}$ is the Z-th column vector of the analog precoder having a size of $N_t \times 1$, and due to the limitation of the analog precoder, which consists only of phase shifters, each has a different phase value in unit amplitude.

Next, the analog precoding matrix of the analog precoder having the Structure 2 as shown in (b) of FIG. 2 may be expressed as the following (Equation 4).

$$F_{RP} = \begin{bmatrix} f_{sub,1} & 0 & \ldots & 0 \\ 0 & f_{sub,2} & 0 & 0 \\ 0 & 0 & \ddots & 0 \\ 0 & 0 & \ldots & f_{sub,N_{RF}} \end{bmatrix} \quad \text{(Equation 4)}$$

Here, $f_{sub,i}$ is the i-th column vector of the analog precoder having a size of $L \times 1$ ($L=N_t/N_{RF}$), and has a unit amplitude value due to the same constraint.

Structure 1 and Structure 2 as above use a total of $N_t \times N_{RF}$ and $N_t$ phase shifters, respectively, because Structure 1 can obtain a larger beamforming gain than Structure 2 but Structure 2 uses fewer phase shifters than Structure 1, it has the advantage of requiring less power.

Accordingly, the present inventive concept proposes an analog precoder of a hybrid beamforming system capable of maximizing frequency spectrum efficiency while satisfying various constraints of the analog precoder and a method of obtaining a matrix of the analog precoder.

The transmission end Tx of the hybrid beamforming system of the present inventive concept is largely configured to include a digital precoder 100, an RF chain 200, and an analog precoder 300 with reference to FIG. 1 described above.

1.1. Digital Precoder 100

The digital precoder 100 is configured to adjust the amplitude and phase of a plurality of data stream signals applied thereto.

1.2. RF Chain 200

The RF chain 200 is provided as many as the number corresponding to the data stream signal, and is configured to transmit the signal whose amplitude and phase are adjusted by the digital precoder 100 to the connected analog precoder 300 by performing RF conversion processing.

Although not shown in the drawings, it is configured to include a conventional RF circuit including a mixer, an analog-to-digital converter (ADC), a digital-to-analog converter (DAC), and the like.

On the other hand, between the digital precoder 100 and the RF chain 200, a fast Fourier inverse transform element K-point IFFT and Cyclic Prefix (CP) for signal processing that are normally configured in the transmission end Tx may be configured.

1.3. Analog Precoder 300

The analog precoder 300 is configured to adjust the phase of the signal by multiplying the output signal from the digital precoder 100 delivered through each RF chain 200 by predetermined analog precoding matrices and radiate a phase-adjusted signal to one or more user terminals user1, user2, . . . corresponding to the reception end Rx through multiple paths.

The present inventive concept is designed by applying an optimal analog precoding matrix obtained through an algorithm to be described later in order to obtain higher frequency spectrum efficiency in the analog precoder 300.

Hereinafter, a method of obtaining an analog precoding matrix of an analog precoder applied to a hybrid beamforming system according to the present inventive concept will be described.

Figure 3:
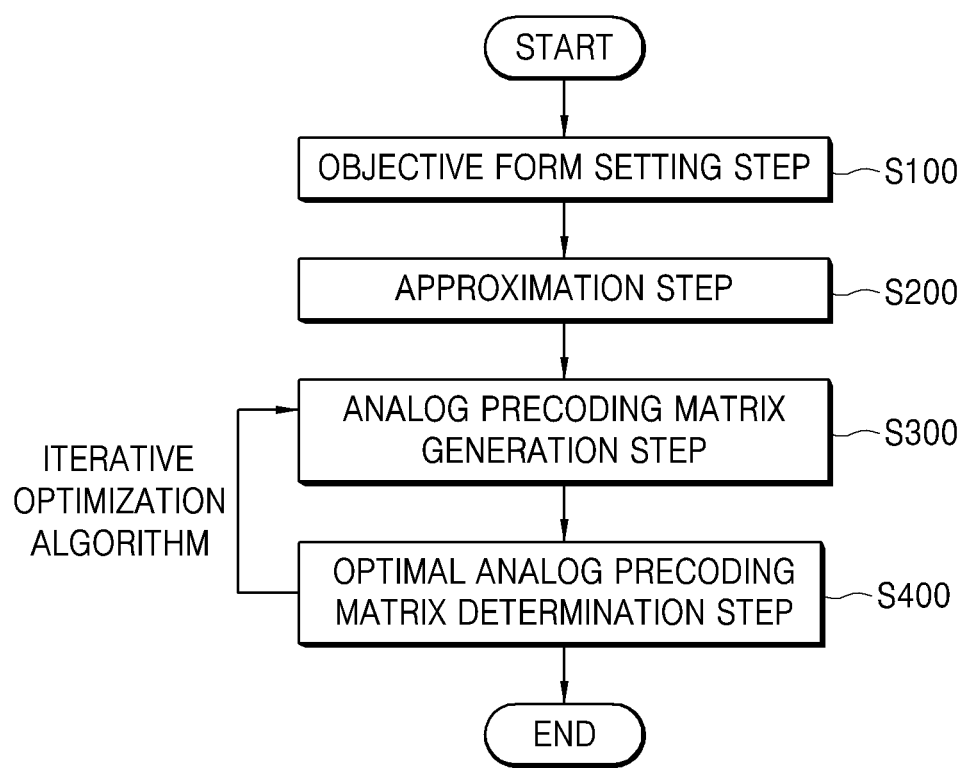
FIG. 3 is a diagram illustrating a method of obtaining an analog precoding matrix according to an embodiment of the present inventive concept.

3. Method of Obtaining Analog Precoder Matrix Based on Hybrid Beamforming System According to Present Inventive Concept FIG. 3 is a diagram illustrating a method of obtaining an analog precoder matrix according to the present inventive concept. Referring to FIG. 3, the method may largely include an objective form setting step S100, an approximation step S200, an analog precoding matrix generation step S300, and an optimal analog precoding matrix determination step S400.

3.1. Objective Form Setting Step S100

First, a step of setting a predetermined objective form based on the frequency spectrum efficiency for the sub-carrier of the transmission end Tx may be performed.

More specifically, the objective form and equality constraint for maximizing the frequency spectrum efficiency of the analog precoder 300 are set. The set objective form and equality constraint are as follows (Equation 5).

$$\text{objective form} = \underset{F_{RF}F_{BB}}{\operatorname{argmax}} \frac{1}{K} \sum_{k=1}^{K} \sum_{u=1}^{N_u} R_u[k] \quad \text{(Equation 5)}$$

$$Tr(F_{RF}F_{BB}[k]F_{BB}[k]^H F_{RF}^H) \leq P \quad \text{equality constraint 1)}$$

$$|F_{RF}(i,j)| = \frac{1}{\sqrt{N_t}} \quad \text{equality constraint 2)}$$

Here, $R_u[k] = \log_2\left(1 + \frac{|h_u[k]^H F_{RF} f_{BB_2}[k]|^2}{\sigma^2 + \sum_{i=1} |h_u[k]^H F_{RF} f_{BB}[k]|^2}\right)$ means the frequency spectrum efficiency for the k-th sub-carrier of the u-th user terminal. P means the maximum transmission power of the transmission end Tx, $\rho^2$ means variance of AWGN, $F_{RF}(i,j)$ is the element corresponding to the (i,j)-th of the $F_{RF}$ matrix, $F_{RF}$ is an analog precoding matrix with a size of $N_t \times N_{RF}$ that is applied equally to all sub-carriers, and $F_{BB}[k]=[f_{BB,1}[k], f_{BB,2}[k], \ldots, f_{BB,N_u}[k]]$ is a digital precoding matrix having a size of $N_{RF} \times N_s$ corresponding to the k-th sub-carrier for $N_u$ user terminals. Also, H represents the hermitian of the matrix.

3.2. Approximation Step S200

After setting the objective form and equality constraint, an approximation step may be performed by modifying the objective form set in the objective form setting step S100 using a digital precoding matrix and a predetermined approximation method for the sub-carrier of the transmission end Tx.

Here, the predetermined approximation method utilizes the well-known Jensen inequality and the characteristics of the definite matrix, and a process of approximation using the above method will be described with reference to the equation below.

Specifically, the digital precoder 100 is designed through zero-forcing (ZF) precoding for an effective channel, and in this case, the effective channel is a combination of the analog precoder 300 and the channel, and the effective channel for the xxx-th sub-carrier can be expressed as the following (Equation 6).

$$H_{eff}[k] = H[k]^H F_{RF} \quad \text{(Equation 6)}$$

In addition, if the normalization process is performed to satisfy the equality constraint 1 above, the digital precoding matrix for the th sub-carrier can be expressed as follows (Equation 7).

$$F_{BB}[k] = \frac{\hat{F}_{BB}[k]}{\left\| F_{RF} \hat{F}_{BB}[k] \right\|_F} \quad \text{(Equation 7)}$$

Here, $\hat{F}_{BB}[k] = H_{eff}[k]^H (H_{eff}[k] H_{eff}[k]^H)^{-1}$ means an unnormalized digital precoder, and $^H$ means the hermitian of the matrix.

Therefore, the objective form of the above (Equation 5) can be approximated as the following (Equation 8) by replacing it with the digital precoding matrix designed in (Equation 7).

$$\frac{1}{K}\sum_{k=1}^{K}\sum_{u=1}^{N_u} R_u[k] = \frac{1}{K}\sum_{k=1}^{K}\sum_{u=1}^{N_u}\log_2\left(1+\frac{1}{\sigma^2}\left|h_u[k]^H F_{RP} f_{BBu}[k]\right|^2\right)$$

$$= \frac{N_u}{K}\sum_{k=1}^{K}\log_2\left(1+\frac{1}{\sigma^2}\frac{1}{\left\|F_{RF}\hat{F}_{BB}[k]\right\|_F^2}\right)$$

$$= \frac{N_u}{K}\sum_{k=1}^{K}\log_2\left(1+\frac{1}{\sigma^2}\frac{1}{Tr\left((H[k]^H F_{RF} F_{RF}^H H[k])^{-1}\right)}\right)$$

Here, the approximation process of $N_t$ is established because the product of the analog precoder satisfies $F_{RF}^H F_{RF} = I$ when the number $N_t$ of transmission antennas is sufficiently large.

However, in (Equation 8), since the matrix of the analog precoder $F_{RF}$ exists in the form of an inverse matrix inside the trace operation, an additional approximation process is performed, which can be derived as follows (Equation 9).

(Equation 9)

$$\frac{1}{K}\sum_{k=1}^{K}\sum_{u=1}^{N_u} R_u[k] =$$

$$\frac{1}{K}\sum_{k=1}^{K}\sum_{u=1}^{N_u}\log_2\left(1+\frac{1}{\sigma^2}\left|h_u[k]^H F_{RF} f_{BB,u}[k]\right|^2\right) \stackrel{(b)}{\leq}$$

$$N_u\log_2\left(1+\frac{1}{\sigma^2 K}\sum_{k=1}^{K}\frac{1}{Tr\left((H[k]^H F_{RF} F_{RF}^H H[k])^{-1}\right)}\right) \stackrel{(c)}{\leq}$$

$$N_u\log_2\left(1+\frac{1}{\sigma^2 KN_u^2}\sum_{k=1}^{K} Tr\left(H[k]^H F_{RF} F_{RF}^H H[k]\right)\right) =$$

$$N_u\log_2\left(1+\frac{1}{\sigma^2 N_u^2} Tr\left(F_{RF}^H\left(\frac{1}{K}\sum_{k=1}^{K}(H[k]H[k]^H)\right)F_{RF}\right)\right) \stackrel{(d)}{\leq}$$

$$N_u\log_2\left(1+\frac{N_{RF}}{\sigma^2 N_u^2}\left|F_{RF}^H\left(\frac{1}{K}\sum_{k=1}^{K} H[k]H[k]^H\right)F_{RF}\right|^{\frac{1}{N_{RF}}}\right)$$

Here, (b) can be derived using the properties of the general Jensen inequality, and (c) and (d) can be derived by utilizing that a normal definite matrix M having a size of n×n satisfies the inequality property of $$\frac{1}{Tr(M^{-1})} \leq \frac{1}{n}\det(M)^{\frac{1}{n}} \leq \frac{1}{n^2} Tr(M).$$

Also, $^H$ represents the hermitian of the matrix.

The final equation d derived through (Equation 9) can obtain a performance gain when it is optimized through a small approximation error, and the present inventive concept can be said to be the ultimate goal to obtain an analog precoding matrix of analog precoder $F_{RF}$ that maximizes the determinant of d.

Therefore, the objective form of (Equation 5) for maximizing the frequency spectrum efficiency can be expressed by converting it to the following (Equation 10).

$$\operatorname*{argmax}_{F_{RF}}\left|F_{RF}^H A F_{RF}\right| \quad \text{(Equation 10)}$$

$$|F_{RF}(i,j)| = \frac{1}{\sqrt{N_1}} \quad \text{equality constraint 1)}$$

Here, $$A = \frac{1}{K}\sum_{k=1}^{K}\left(H[k]H[k]^H\right)$$

means the average channel covariance matrix for all sub-carriers, and $^H$ represents the hermitian of the matrix. On the other hand, equality constraint 1 in the objective form of (Equation 5) was omitted because it was satisfied through the normalization process above (Equation 6).

3.3. Analog Precoding Matrix Generation Step S300

Next, the step of generating an analog precoding matrix using the objective form approximated through the approximation step S200 may be performed.

It was converted as (Equation 10) through the approximation of the objective form above (Equation 5), but it is still a difficult problem to perform optimization while satisfying the equality constraint 2 of the analog precoder using the objective form of (Equation 10). Therefore, the objective form of (Equation 10) is additionally transformed through the property of the determinant, which can be expressed as the following (Equation 11).

$$|F_{RF}^H A F_{RF}| = \begin{vmatrix} f_l^H A f_l & f_l^H A F_{RF}^l \\ F_{RF}^{l\,H} A f_l F_{RF}^l & {}^H A F_{RF}^l \end{vmatrix}$$
$$= |f_l^H (A - A F_{RF}^l (F_{RF}^{l\,H} A F_{RF}^l)^{-1} F_{RF}^{l\,H} A) f_l|$$
$$|F_{RF}^l A F_{RF}^l|$$
$$= |f_l^H B_l f_l||F_{RF}^{l\,H} A F_{RF}^l|$$

(Equation 11)

Here, $F_{RF}^l$ means a matrix in which the l-th column is removed from $F_{RF}$, $f_l$ means the l-th column in $F_{RF}$, $B_l = A - A F_{RF}^l (F_{RF}^{l\,H} A F_{RF}^l)^{-1} F_{RF}^{l\,H} A$ means a semi-definite matrix, and $^H$ means the hermitian of the matrix. The transformation of (Equation 11) can be derived through $$\begin{vmatrix} A & B \\ C & D \end{vmatrix} = |A - B D^{-1} C||D|,$$

which is a property of a determinant.

In the final expression of (Equation 11), since $|F_{RF}^l{}^H A F_{RF}^l|$ has an independent relationship with $f_l$, it means that optimization can be performed only on the l-th column, and through this, optimization can be performed for each column of the analog precoder, and the objective form of (Equation 10) can be expressed by applying (Equation 11) to the following (Equation 12).

Here, as described above, the algorithm of the present inventive concept can be applied to both structures of the analog precoder as shown in FIG. 2. Accordingly, according to the structure of the analog precoder, the conversion of the objective form of (Equation 10) to be described later using the property of the determinant (Equation 12) may be expressed differently depending on the structure of the analog precoder.

Embodiment 1: Analog Precoder of Structure 1

$$\underset{f_l}{\operatorname{argmax}} \sum_{l=1}^{N_{RF}} |f_l^H B_l f_l| \quad \text{(Equation 12)}$$

$$|f_l(m)| = \frac{1}{\sqrt{N_l}} \quad \text{equality constraint 1)}$$

In order to improve the frequency spectrum efficiency, an analog precoding matrix that maximizes the objective form of (Equation 12) is calculated for each column. In this case, all elements of the analog precoding matrix must satisfy the constraint having the same amplitude. The l-th analog precoding vector is constructed using only the phase of $(f_l^H B_l)^H$, which is as follows (Equation 13).

$$f_l = \frac{1}{\sqrt{N_t}} e^{j\left((f^H B_l)^H\right)} \quad \text{(Equation 13)}$$

An analog precoding matrix can be generated by calculating each column of all analog precoding matrices using (Equation 13).

Embodiment 2: Analog Precoder of Structure 2

On the other hand, in the case of an analog precoder having the Structure 2 as shown in FIG. 2(b), vectors having a length of L form a diagonal matrix in the form of a block, and accordingly, the objective function and equality constraint for Structure 2 can be expressed as the following (Equation 14).

$$\underset{f_{sub,l}}{\operatorname{argmax}} \sum_{i=1}^{N_{RF}} |f_{sub,l}^H B_{sub,l} f_{sub,l}| \quad \text{(Equation 14)}$$

$$|f_{sub,l}(m)| = \frac{1}{\sqrt{L}} \quad \text{equatlity constraint 1)}$$

Here, $N_{RF}$ means the number of RF chains, $f_{sub,l}$ means the l-th column of the analog precoding matrix having a length of L, $B_{sub,l}$ means the l-th block matrix of $B_l$ having a size of L×L, and $^H$ means the hermitian of the matrix.

$f_{sub,l}$ can be expressed by the following (Equation 15).

$$f_{sub,l} = \frac{1}{\sqrt{L}} e^{j\left((f_{sub}^H B_{sub,l})^H\right)} \quad \text{(Equation 15)}$$

Accordingly, one analog precoder matrix can be generated by calculating each column of the analog precoder matrix using the above (Equation 15).

3.4. Optimal Analog Precoding Matrix Determination Step S400

When the analog precoding matrix is generated, by comparing the generated analog precoding matrix with the analog precoding matrix previously precoded, according to whether the error between the two matrices is within a predetermined error range, it may be determined whether the generated analog precoding matrix is an optimal analog precoding matrix for frequency spectrum improvement.

When the error between the two matrices is within a predetermined error range, by determining the generated analog precoding matrix as an optimal analog precoder for frequency spectrum improvement, the analog precoding matrix can be applied to the analog precoder.

In this case, a predetermined initial analog precoding matrix on which analog precoding is previously performed, that is, the analog precoder is previously applied, may be updated with the optimal analog precoding matrix.

On the other hand, when the error between the two matrices is out of a predetermined error range, by recalculating each column of the generated analog precoder matrix, and comparing it to whether an error with the previously performed analog precoding matrix is included within a predetermined error range, each column of the analog precoding matrix is recalculated and updated by returning to the analog precoding matrix generation step S300 until it is included within the predetermined error range, and by repeatedly performing the process of comparing the error with a predetermined initial analog precoding matrix before, an analog precoder with improved frequency spectrum efficiency can be designed by applying an analog precoding matrix when the error is within a predetermined error range to the analog precoder.

In other words, by comparing the loss function (Mean Squared Error (MSE)) between the generated analog precoding matrix and the previously performed analog precoding matrix, through an iterative optimization process using the error minimization technique between the two matrices, it is possible to obtain an optimal analog precoding matrix to improve the frequency spectrum efficiency, and this shows an optimization process for obtaining an optimal analog precoding matrix in FIG. 4.

By obtaining the optimal analog precoding matrix through iterative optimization using the approximation and error minimization technique of the objective form for improving the frequency spectrum and applying the optimal analog precoding matrix to the analog precoder, it is possible to achieve results that allow higher frequency spectral efficiencies to be achieved in analog precoders.

Figure 5:
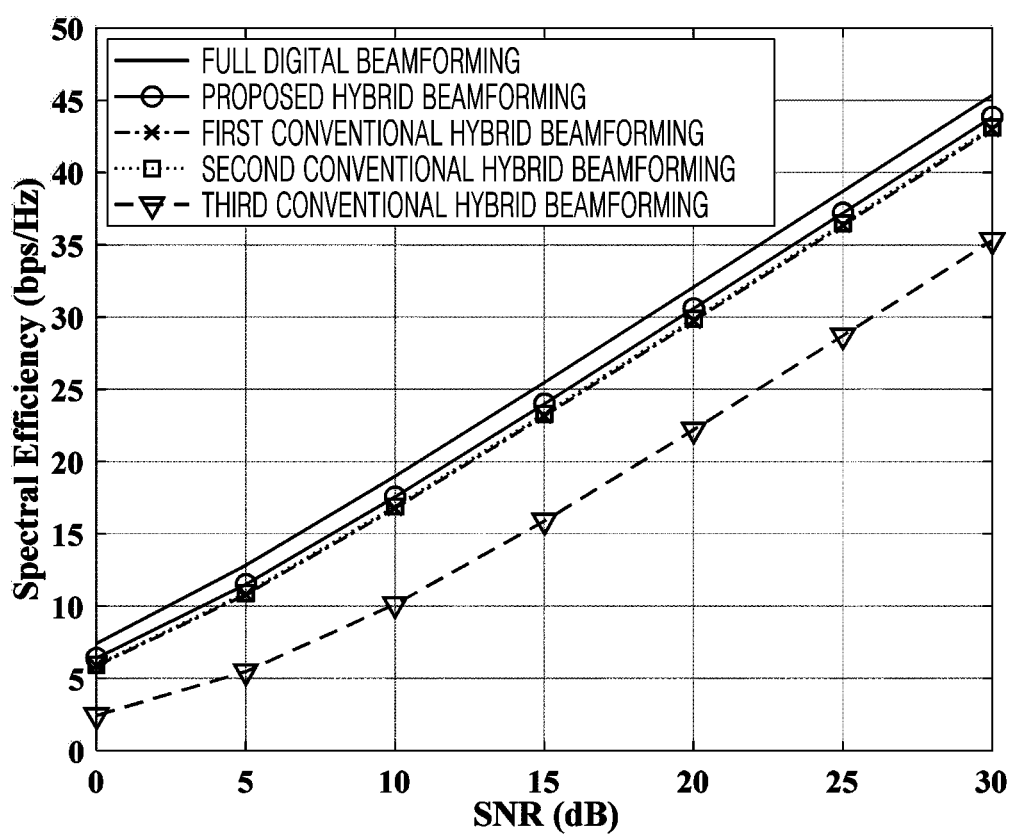
FIG. 5 is a graph showing the comparison of the frequency spectral efficiency of the present inventive concept and the prior art according to the signal-to-noise ratio (SNR) for the analog precoder of Structure 1.
Figure 6:
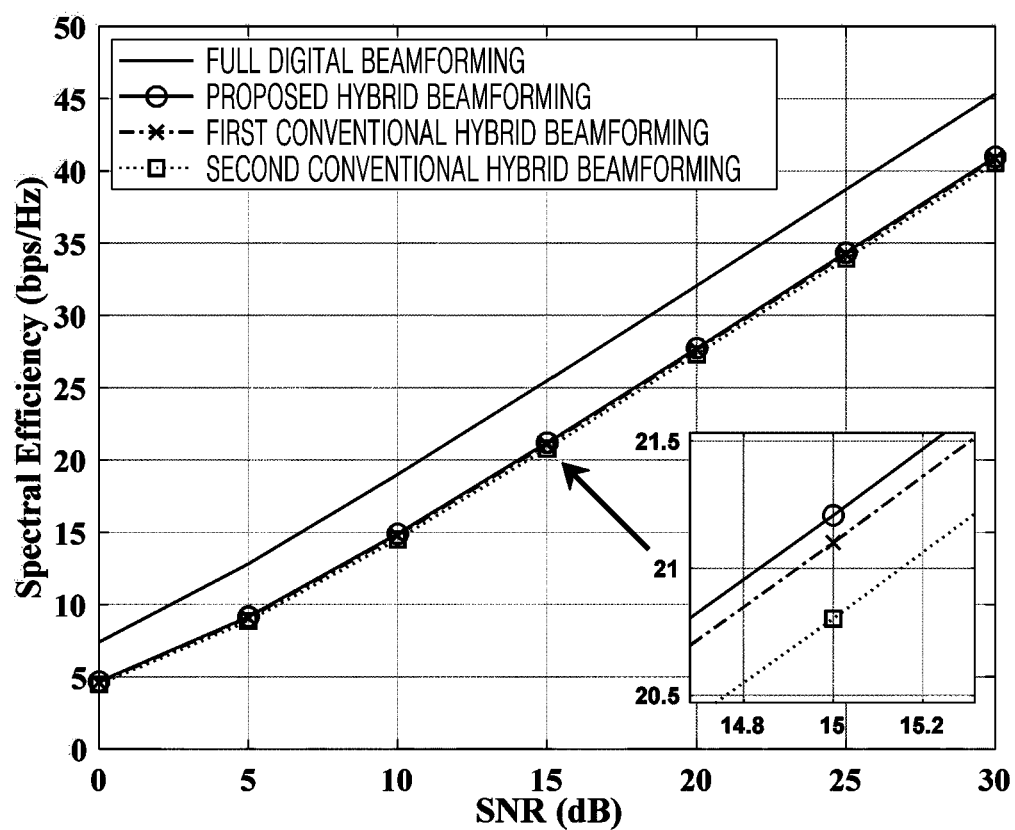
FIG. 6 is a graph showing the comparison of the frequency spectral efficiency of the present inventive concept and the prior art according to the signal-to-noise ratio (SNR) for the analog precoder of Structure 2.
Figure 7:
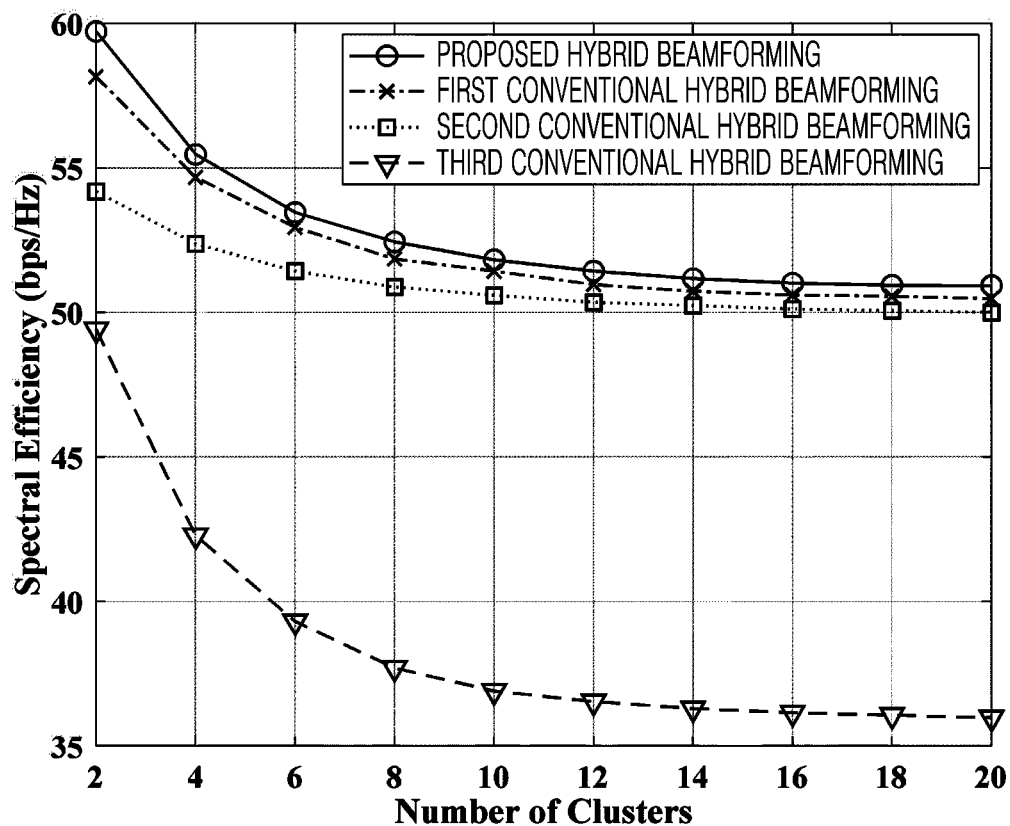
FIG. 7 is a graph showing a comparison of the frequency spectrum efficiency of the present inventive concept and the prior art according to the number of clusters.
Figure 8:
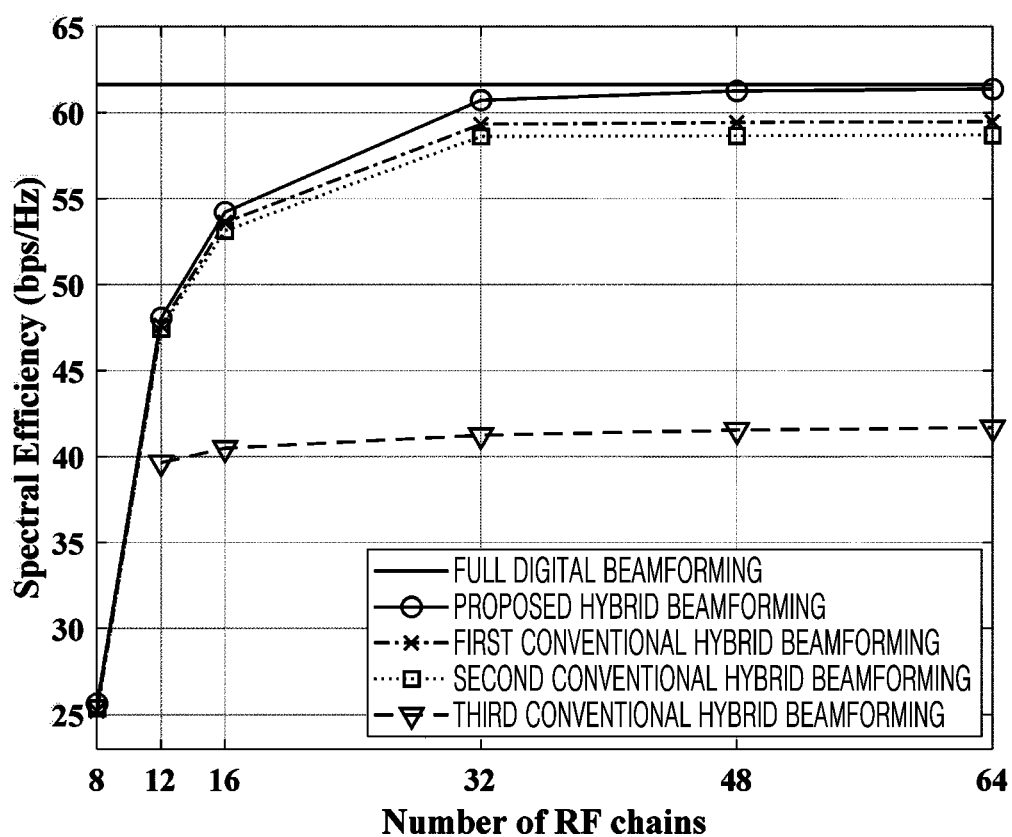
FIG. 8 is a graph showing a comparison of the frequency spectrum efficiency of the present inventive concept and the prior art according to the number of RF chains.

FIGS. 5 and 6 are graphs comparing the frequency spectrum efficiency according to the signal-to-noise ratio (SNR) between the hybrid beamforming according to the present inventive concept and the conventional hybrid beamforming, with respect to the two structures of analog precoder, and FIGS. 7 and 8 are diagrams comparing the frequency spectrum efficiency according to the number of channel clusters or RF chains between the hybrid beamforming according to the present inventive concept and the conventional hybrid beamforming in an environment where 64 transmission antenna base stations (transmission end Tx) and 8 single antenna users (reception end Rx) exist.

Before describing FIGS. 5 to 8, the prior art described in FIGS. 5 to 8 will be briefly described.

The first existing hybrid beamforming (thesis: "Hybrid Beamforming Design for Downlink MU-MIMO-OFDM Millimeter-Wave Systems") relates to an analog precoder design technique in a frequency selective fading environment, and presents a technique for designing an analog precoder by performing an approximation process of the frequency spectrum efficiency equation to perform optimization, setting the objective function through the approximated equation, and performing iterative optimization until a specific convergence condition is satisfied. In the case of the first conventional hybrid beamforming, a large error occurs in the approximation process compared to the method according to the present inventive concept, and thus performance is degraded.

The second conventional hybrid beamforming (thesis: "Low-Complexity OFDM-Based Hybrid Precoding for Multiuser Massive MIMO Systems") presents a technique for designing an analog precoder by designing an objective function through the same approximation process as the first conventional hybrid beamforming and performing the SVD decomposition on the channel covariance matrix of the sub-carrier average to extract the phase of the singular matrix at this time.

The third conventional hybrid beamforming (thesis: "Hybrid Digital and Analog Beamforming Design for Large-Scale Antenna Arrays") relates to an analog precoder design technique in a multi-user MIMO flat fading environment, and an analog precoding matrix is designed to minimize transmission power while satisfying the power constraint of the base station, and an iterative optimization algorithm is used in the precoder design process. Although the third conventional hybrid beamforming shows good performance in a frequency flat fading environment, there is a problem in that it shows a large performance degradation in a frequency selective environment.

FIG. 5 is about Structure 1 of the analog precoder, and FIG. 6 is about Structure 2 of the analog precoder. FIGS. 5 and 6 compare full digital beamforming, hybrid beamforming proposed in the present inventive concept, and conventional hybrid beamforming under the assumption of an environment in which 16 transmission antenna base stations (transmission end Tx) and 4 single antenna users (reception end Rx) exist.

The graph of FIG. 5 shows the frequency spectrum efficiency according to the signal-to-noise ratio (SNR) for the analog precoder of Structure 1. As shown in FIG. 5, it can be seen that the hybrid beamforming proposed in the present inventive concept exhibits the closest performance to full digital beamforming compared to the existing hybrid beamforming.

The graph of FIG. 6 shows the frequency spectrum efficiency according to the signal-to-noise ratio (SNR) for the analog precoder of Structure 2. Also, as shown in FIG. 6, it can be confirmed that the hybrid beamforming proposed in the present inventive concept achieves the performance closest to full digital beamforming compared to the existing hybrid beamforming.

FIGS. 7 and 8 compare the hybrid beamforming proposed in the present inventive concept with the conventional hybrid beamforming under the assumption of an environment in which 64 transmission antenna base stations (transmission end Tx) and 8 single antenna users (reception end Rx) exist.

The graph of FIG. 7 shows the frequency spectrum efficiency according to the number of clusters. As shown in FIG. 7, as the number of clusters increases, the deviation between the hybrid beamforming proposed in the present inventive concept and the existing hybrid beamforming tends to decrease, but overall, it can be seen that the hybrid beamforming proposed in the present inventive concept exhibits small performance degradation even in a state in which the number of clusters increases compared to the conventional hybrid beamforming. Here, increasing the number of clusters means that the frequency-selective environment becomes more severe, and in the case of the hybrid beamforming of the present inventive concept even in an environment in which performance degradation occurs significantly, it shows that there is no significant performance degradation.

The graph of FIG. 8 shows the frequency spectrum efficiency according to the number of RF chains. Referring to FIG. 8, as the number of RF chains increases, it can be seen that the performance difference between the hybrid beamforming of the present inventive concept and the conventional hybrid beamforming is large. Through this, it can be confirmed that as the number of RF chains is greater, the performance gain is improved more. Since the number of RF chains is very large in the real environment compared to the experimental environment in FIG. 8, in a real environment, it can be predicted that the hybrid beamforming according to the present inventive concept can achieve much better performance than the conventional hybrid beamforming.

On the other hand, although the technical idea of the present inventive concept has been specifically described according to the above embodiment, it should be noted that the above embodiments are for the purpose of explanation and not limitation. In addition, those skilled in the art in the technical field of the present inventive concept will be able to understand that various embodiments are possible within the scope of the spirit of the present inventive concept.

The invention claimed is:

1. An analog precoding matrix acquisition method for frequency spectrum enhancement, the method comprising:

an objective form setting step of setting an objective form for maximizing a frequency spectrum efficiency of an analog precoder based on a frequency spectrum efficiency for a sub-carrier of a transmission end Tx;

an approximation step of transforming and approximating the objective form set in the objective form setting step using a digital precoding matrix for the sub-carrier of the transmission end Tx;

an analog precoding matrix generation step of generating an analog precoding matrix by calculating for each column of the analog precoding matrix based on the objective form approximated through the approximation step; and an optimal analog precoding matrix determination step of comparing elements between the analog precoding matrix generated in the analog precoding matrix generation step and a predetermined initial analog precoding matrix currently applied to the analog precoder to determine an optimal analog precoding matrix according to whether an error between the generated analog precoding matrix and the predetermined initial analog precoding matrix is within a predetermined error range.

2. The method of claim 1, wherein the optimal analog precoding matrix determination step comprises, when the error between the generated analog precoding matrix and the predetermined initial analog precoding matrix is included within the predetermined error range, determining the generated analog precoding matrix as the optimal analog precoding matrix for frequency spectrum improvement and updating the predetermined initial analog precoding matrix to the optimal analog precoding matrix.

3. The method of claim 1, wherein the optimal analog precoding matrix determination step comprises, when the error between the generated analog precoding matrix and the predetermined initial analog precoding matrix is out of a predetermined error range, deriving the optimal analog precoding matrix by repeatedly performing the analog precoding matrix generation step to the optimal analog precoding matrix determination step until the error is within the predetermined error range.

4. The method of claim 1, wherein the objective form set in the objective form setting step is according to the following (Equation 1), $$\underset{F_{RF}F_{BB}}{\mathrm{argmax}} \frac{1}{K}\sum_{k=1}^{K}\sum_{u=1}^{N_u} R_u[k] \quad \text{(Equation 1)}$$

here, $N_t$ is the number of transmission antennas, $N_{RF}$ is the number of RF chains, $F_{RF}$ is the analog precoding matrix of a size of $N_t \times N_{RF}$ that is equally applied to all sub-carriers, $N_u$ is the number of user terminals having a single antenna corresponding to a reception end Rx, $F_{BB}[k]=[f_{BB,1}[k], f_{BB,2}[k], \ldots, f_{BB,N_u}[k]]$ is digital precoding matrix having a size of $N_{RF} \times N_s$ corresponding to the k-th sub-carrier for $N_u$ user terminals, and $$R_2[k] = \log_2\left(1 + \frac{|h_u[k]^H F_{RF} f_{BB,u}[k]|^2}{\sigma^2 + \sum_{i=u}|h_u[k]^H F_{RF} f_{BB,i}[k]|^2}\right)$$

means the frequency spectrum efficiency for the k-th sub-carrier of the u-th user terminal, P means the maximum transmission power of the transmission end Tx, $\sigma^2$ means variance of Additive White Gaussian Noise (AWGN), and $^H$ represents a Hermitian matrix.

5. The method of claim 4, wherein the objective form obtained by using the digital precoding matrix for the sub-carrier of the transmission end Tx of the objective form of (Equation 1) above is derived by the following (Equation 2), $$\frac{1}{K}\sum_{k=1}^{K}\sum_{u=1}^{N_u} R_u[k] \geq \quad \text{(Equation 2)}$$

$$N_u \log_2\left(1 + \frac{N_{RF}}{\sigma^2 N_u^2}\left|F_{RF}^H\left(\frac{1}{K}\sum_{k=1}^{K} H[k]H[k]^H\right)F_{RF}\right|^{\frac{1}{N_{RF}}}\right)$$

here, $N_t$ is the number of transmission antennas, $N_{RF}$ is the number of RF chains, $F_{RF}$ is the analog precoding matrix of the size of $N_t \times N_{RF}$ that is equally applied to all sub-carriers, $N_u$ is the number of user terminals having a single antenna corresponding to the reception end Rx, $$R_u[k] = \log_2\left(1 + \frac{|h_u[k]^H F_{RF} f_{BB,u}[k]|^2}{\sigma^2 + \sum_{i=u}|h_u[k]^H F_{RF} f_{BB,i}[k]|^2}\right)$$

means the frequency spectrum efficiency for the k-th sub-carrier of the u-th user terminal, and $^H$ represents a Hermitian matrix.

6. The method of claim 1, wherein in the analog precoding matrix generation step, the generating of the analog precoding matrix based on the approximated objective form is performed by the following (Equation 3), $$\underset{f_l}{\mathrm{argmax}} \sum_{l=1}^{N_{RF}} |f_l^H B_l f_l| \quad \text{(Equation 3)}$$

here, $N_{RF}$ is the number of RF chains, $$f_l = \frac{1}{\sqrt{N_l}} e^{j\left((f_l^H B_l)^H\right)}$$

is an expression for calculating the l-th column vector of the analog precoding matrix, $B_l = A - AF_{RF}^l(F_{RF}^{l\ H}AF_{RF}^l)^{-1}F_{RF}^{l\ H}A$ means a semi-determined matrix, $$A = \frac{1}{K}\sum_{k=1}^{K}\left(H[k]H[k]^H\right)$$

means an average channel covariance matrix for all K sub-carriers, $F_{RF}$, is the analog precoding matrix of the size of $N_t \times N_{RF}$ that is equally applied to all sub-carriers, $f_l$ means the l-th column in $F_{RF}$, $F_{RF}^l$ means a matrix with the l-th column removed from $F_{RF}$, and $^H$ represents a Hermitian matrix.

7. The method of claim 5, wherein in the approximation step,
the approximation of the objective form of (Equation 1) using the digital precoding matrix for the sub-carrier of the transmission end Tx is to be approximated according to the following (Equation 5), $$\frac{1}{K}\sum_{k=1}^{K}\sum_{u=1}^{N_u}R_u[k] \overset{(a)}{\leq} \quad \text{(Equation 5)}$$

$$\frac{N_u}{K}\sum_{k=1}^{K}\log_2\left(1+\frac{1}{\sigma^2}\frac{1}{Tr((H[k]^H F_{RF}F_{RF}^H H[k])^{-1})}\right) \overset{(b)}{\leq}$$

$$N_u\log_2\left(1+\frac{1}{\sigma^2 K}\sum_{k=1}^{K}\frac{1}{Tr((H[k]^H F_{RF}F_{RF}^H H[k])^{-1})}\right) \overset{(c)}{\leq}$$

$$N_u\log_2\left(1+\frac{1}{\sigma^2 K N_u^2}\sum_{k=1}^{K}Tr(H[k]^H F_{RF}F_{RF}^H H[k])\right) =$$

$$N_u\log_2\left(1+\frac{1}{\sigma^2 N_u^2}Tr\left(F_{RF}^H\left(\frac{1}{K}\sum_{k=1}^{K}(H[k]H[k]^H)F_{RF}\right)\right)\right) \overset{(d)}{\leq}$$

$$N_u\log_2\left(1+\frac{N_{RF}}{\sigma^2 N_u^2}\left|F_{RF}^H\left(\frac{1}{K}\sum_{k=1}^{K}H[k]H[k]^H\right)F_{RF}\right|^{\frac{1}{N_{RF}}}\right)$$

here, $N_u$ is the number of user terminals having a single antenna corresponding to the reception end Rx, $$R_u[k] = \log_2\left(1+\frac{|h_u[k]^H F_{RF}f_{BB,u}[k]|^2}{\sigma^2+\sum_{i=u}|h_u[k]^H F_{RF}f_{BB,i}[k]|^2}\right)$$

means the frequency spectrum efficiency of the k-th sub-carrier of the u-th user terminal, $^H$ represents a Hermitian matrix, $\sigma^2$ means dispersion of Additive White Gaussian Noise (AWGN), $H_{eff}[k]=H[k]^H F_{RF}$ means an effective channel expressed by the combination of an analog precoder and a channel, in addition, (b) utilizes Jensen's inequality, and (c) and (d) are derived by utilizing the fact that a definite matrix M having a size of n×n satisfies the inequality property of $$\frac{1}{Tr(M^{-1})} \leq \frac{1}{n}\det(M)^{\frac{1}{n}} \leq \frac{1}{n^2}Tr(M).$$

8. A multi-user MIMO-based hybrid beamforming system (only, $(N_s<N_{RF}\ll N_t, N_s=N_u)$) in which a base station with $N_t$ transmission antennas and $N_{RF}$ RF chains supports $N_s$ independent data streams to $N_u$ user terminals having one antenna, the system comprising:
a digital precoder configured to adjust an amplitude and phase of a plurality of data stream signals to be applied;
an RF chain provided as many as the number corresponding to the data stream signals, and configured to RF-convert the data stream signal whose amplitude and phase are adjusted by the digital precoder and transmit the converted signal to an analog precoder;
wherein the analog precoder is configured to adjust the phase of the signal by multiplying the signal output from the digital precoder delivered through each RF chain by predetermined analog precoding matrices, and radiate the phase-adjusted signals to one or more user terminals through multiple paths, and
wherein the analog precoding matrix of the analog precoder is approximated by modifying an objective form set to maximize a frequency spectrum efficiency of the analog precoder based on the frequency spectrum efficiency for the sub-carrier to each user terminal and is applied as an optimal analog precoding matrix generated based on the approximated objective form.

9. The system of claim 8, wherein the optimal analog precoding matrix is determined as an analog precoding matrix generated to satisfy a predetermined error range condition by comparing whether the error between the analog precoding matrix generated based on the approximated objective form and a predetermined initial analog precoding matrix of the analog precoder meets the predetermined error range condition.

10. The system of claim 9, wherein the analog precoder consists of a first structure in which $N_t$ transmission antennas are connected to all $N_{RF}$ RF chains, respectively.

11. The system of claim 9, wherein the analog precoder consists of a second structure in which xxx transmission antennas are connected to one RF chain.

12. The system of claim 10, wherein the objective form set to maximize the frequency spectrum efficiency of the analog precoder is according to the following (Equation 1), $$\underset{F_{RF},F_{BB}}{\text{argmax}} \frac{1}{K}\sum_{k=1}^{K}\sum_{u=1}^{N_u}R_u[k] \quad \text{(Equation 1)}$$

here, $N_t$ is the number of transmission antennas, $N_{RF}$ is the number of RF chains, $F_{RF}$ is the analog precoding matrix of a size of $N_t\times N_{RF}$ that is equally applied to all sub-carriers, $N_u$ is the number of user terminals having a single antenna corresponding to a reception end Rx, $F_{BB}[k]=[f_{BB,1}[k], f_{BB,2}[k], \ldots, f_{BB,N_u}[k]]$ is a digital precoding matrix having a size of $N_{RF}\times N_s$ corresponding to the k-th sub-carrier for $N_u$ user terminals, and $$R_u[k] = \log_2\left(1+\frac{|h_u[k]^H F_{RF}f_{BB,u}[k]|^2}{\sigma^2+\sum_{i=u}|h_u[k]^H F_{RF}f_{BB,1}[k]|^2}\right)$$

means the frequency spectrum efficiency for the k-th sub-carrier of the u-th user terminal, P means the maximum transmission power of a transmission end Tx, $\sigma^2$ means variance of Additive White Gaussian Noise (AWGN), and $^H$ represents a Hermitian matrix.

13. The system of claim 12, wherein the approximation of the objective form of (Equation 1) is approximated using the digital precoding matrix for the sub-carrier of the transmission end Tx,
wherein the approximated objective form is derived by the following (Equation 2), $$\frac{1}{K}\sum_{k=1}^{K}\sum_{u=1}^{N_u}R_u[k] \geq \quad \text{(Equation 2)}$$

$$N_u\log_2\left(1+\frac{N_{RF}}{\sigma^2 N_u^2}\left|F_{RF}^H\left(\frac{1}{K}\sum_{k=1}^{K}H[k]H[k]^H\right)F_{RF}\right|^{\frac{1}{N_{RF}}}\right)$$

here, $N_t$ is the number of transmission antennas, $N_{RF}$ is the number of RF chains, $F_{RF}$ is an analog precoding matrix of the size of $N_t \times N_{RF}$ that is equally applied to all sub-carriers, $N_u$ is the number of user terminals having a single antenna corresponding to the reception end Rx, $$R_u[k] = \log_2\left(1 + \frac{|h_u[k]^H F_{RF} f_{BB,u}[k]|^2}{\sigma^2 + \sum_{i=u} |h_u[k]^H F_{RF} f_{BB,i}[k]|^2}\right)$$

means the frequency spectrum efficiency for the k-th sub-carrier of the u-th user terminal, and $^H$ represents a Hermitian matrix.

14. The system of claim 13, wherein the analog precoding matrix generated based on the approximated objective form is generated by the following (Equation 3), $$\underset{f_l}{\operatorname{argmax}} \sum_{l=1}^{N_{RF}} |f_l^H B_l f_l| \quad \text{(Equation 3)}$$

here, $N_{RF}$ is the number of RF chains, $$f_l = \frac{1}{\sqrt{N_l}} e^{j\left((f_l^H B_l)^H\right)}$$

is an expression for calculating the l-th column vector of the analog precoding matrix, $B_l = A - AF_{RF}^l (F_{RF}^{l\,H} A F_{RF}^l)^{-1} F_{RF}^{l\,H} A$ means a semi-determined matrix, $$A = \frac{1}{K} \sum_{k=1}^{K} (H[k] H[k]^H)$$

means an average channel covariance matrix for all K sub-carriers, $f_l$ means the l-th column in $F_{RF}$, $F_{RF}^l$ means a matrix with the l-th column removed from $F_{RF}$, and $^H$ represents a Hermitian matrix.

15. The system of claim 13, wherein the analog precoding matrix generated based on the approximated objective form is generated by the following (Equation 4), $$\underset{f_{sub,l}}{\operatorname{argmax}} \sum_{l=1}^{N_{RF}} |f_{sub,l}^H B_{sub,l} f_{sub,l}| \quad \text{(Equation 4)}$$

here, $N_{RF}$ is the number of RF chains, $$f_{sub,l} = \frac{1}{\sqrt{L}} e^{j\left((f_{sub,l}^H B_{sub,l})^H\right)}$$

is an expression to calculate the l-th column vector of the analog precoding matrix, $f_{sub,l}$ is the l-th column of the analog precoding matrix having a length of L, and $B_{sub,l}$ means the l=th block matrix of $B_l$ having a size of L×L, and $^H$ represents a Hermitian matrix.

16. The system of claim 13, wherein the approximation of the objective form of (Equation 1) using the digital precoding matrix for the sub-carrier of the transmission end Tx is to be approximated according to the following (Equation 5), (Equation 5)

$$\frac{1}{K} \sum_{k=1}^{K} \sum_{u=1}^{N_u} R_u[k] \overset{(a)}{\leq}$$

$$\frac{N_u}{K} \sum_{k=1}^{K} \log_2\left(1 + \frac{1}{\sigma^2} \frac{1}{Tr\left((H[k]^H F_{RF} F_{RF}^H H[k])^{-1}\right)}\right) \overset{(b)}{\leq}$$

$$N_u \log_2\left(1 + \frac{1}{\sigma^2 K} \sum_{k=1}^{K} \frac{1}{Tr\left((H[k]^H F_{RF} F_{RF}^H H[k])^{-1}\right)}\right) \overset{(c)}{\leq}$$

$$N_u \log_2\left(1 + \frac{1}{\sigma^2 K N_u^2} \sum_{k=1}^{K} Tr\left(H[k]^H F_{RF} F_{RF}^H H[k]\right)\right) =$$

$$N_u \log_2\left(1 + \frac{1}{\sigma^2 N_u^2} Tr\left(F_{RF}^H \left(\frac{1}{K} \sum_{k=1}^{K} (H[k] H[k]^H)\right) F_{RF}\right)\right) \overset{(d)}{\geq}$$

$$N_u \log_2\left(1 + \frac{N_{RF}}{\sigma^2 N_u^2} \left|F_{RF}^H \left(\frac{1}{K} \sum_{k=1}^{K} H[k] H[k]^H\right) F_{RF}\right|^{\frac{1}{N_{RF}}}\right)$$

here, $N_u$ is the number of user terminals having a single antenna corresponding to the reception end Rx, $$R_u[k] = \log_2\left(1 + \frac{|h_u[k]^H F_{RF} f_{BB,u}[k]|^2}{\sigma^2 + \sum_{i=u} |h_u[k]^H F_{RF} f_{BB,i}[k]|^2}\right)$$

means the frequency spectrum efficiency of the k-th sub-carrier of the u-th user terminal, $^H$ represents a Hermitian matrix, $\sigma^2$ means dispersion of Additive White Gaussian Noise (AWGN), $H_{eff}[k] = H[k]^H F_{RF}$ means an effective channel expressed by the combination of an analog precoder and a channel, in addition, (b) utilizes Jensen's inequality, and (c) and (d) are derived by utilizing the fact that a definite matrix M having a size of n×n satisfies the inequality property of $$\frac{1}{Tr(M^{-1})} \leq \frac{1}{n} \det(M)^{\frac{1}{n}} \leq \frac{1}{n^2} Tr(M).$$

\* \* \* \* \*